United States Patent
Riedinger et al.

(10) Patent No.: US 10,546,504 B2
(45) Date of Patent: Jan. 28, 2020

(54) SECURE SEQUENCING OF AIRCRAFT FLIGHT PLAN

(71) Applicant: THALES, Courbevoie (FR)

(72) Inventors: Marc Riedinger, Toulouse (FR); Emmanuel Dewas, Toulouse (FR); Alexandre Darbois, Toulouse (FR)

(73) Assignee: THALES, Courbevoie (FR)

( * ) Notice: Subject to any disclaimer, the term of this patent is extended or adjusted under 35 U.S.C. 154(b) by 162 days.

(21) Appl. No.: 15/476,486

(22) Filed: Mar. 31, 2017

(65) Prior Publication Data
US 2017/0301244 A1 Oct. 19, 2017

(30) Foreign Application Priority Data
Apr. 15, 2016 (FR) .................................. 16 00633

(51) Int. Cl.
| | |
|---|---|
| G01C 23/00 | (2006.01) |
| G05D 1/00 | (2006.01) |
| G05D 3/00 | (2006.01) |
| G06F 7/00 | (2006.01) |
| G06F 17/00 | (2019.01) |
| G08G 5/00 | (2006.01) |
| G05D 1/08 | (2006.01) |
| G01C 21/00 | (2006.01) |

(52) U.S. Cl.
CPC .................................. G08G 5/0039 (2013.01)

(58) Field of Classification Search
CPC .... G08G 5/0039; G08G 5/003; G05D 1/0077; G05D 1/00; G06F 7/00
USPC ................................................ 701/3, 4, 200
See application file for complete search history.

(56) References Cited

U.S. PATENT DOCUMENTS

| | | | | |
|---|---|---|---|---|
| 4,622,667 | A * | 11/1986 | Yount ...................... | G05B 9/03 700/79 |
| 8,660,715 | B2 | 2/2014 | Nicolas et al. | |
| 2005/0004745 | A1* | 1/2005 | Rumbo .................. | G01C 21/20 701/532 |
| 2012/0173052 | A1* | 7/2012 | Nicolas ................ | G05D 1/0077 701/3 |
| 2014/0365041 | A1* | 12/2014 | Deker .................. | G05D 1/0607 701/4 |

(Continued)

FOREIGN PATENT DOCUMENTS

EP  2 818 956 A1  12/2014

*Primary Examiner* — Mahmoud S Ismail
(74) *Attorney, Agent, or Firm* — Baker & Hostetler LLP

(57) ABSTRACT

A method for manipulating aircraft flight plan segments is provided. A result of an avionics calculation, such as a flight plan sequencing, is selected from among a plurality of results determined by a plurality of systems executed in parallel and placed in competition, each system communicating to at least part of the other systems conditions to be satisfied by the result of a calculation, the method comprises the steps of a given system from among the plurality of systems shares its own calculation result with at least one other system only if its own calculation result satisfies the conditions received from at least one other system. Developments describe various modalities of negotiation and/or selection of the results, the switch to independent and/or the deactivation of a system, voting and/or weighting mechanisms. Software and system aspects are described.

15 Claims, 4 Drawing Sheets

(56) References Cited

U.S. PATENT DOCUMENTS

2015/0201023 A1\* 7/2015 Kotab .................... H04L 65/60
                                                                               709/208

\* cited by examiner

SECURE SEQUENCING OF AIRCRAFT FLIGHT PLAN

CROSS-REFERENCE TO RELATED APPLICATIONS

This application claims priority to foreign French patent application No. FR 1600633, filed on Apr. 15, 2016, the disclosure of which is incorporated by reference in its entirety.

FIELD OF THE INVENTION

The invention relates to the technical field of aircraft flight management systems.

BACKGROUND

In avionics, sequencing a flight plan means determining the next flight plan segment ("leg") which must be flown by an aircraft. When all the conditions are fulfilled, the aircraft will indeed fly this determined flight plan segment. In actual fact, a change of flight plan segment, which generally proceeds within the flight management system (FMS), is particularly tricky to determine. In an RNP AR ("Required Navigation Performance Authorization Required") context, which is particularly demanding in respect of aircraft guidance, the sequencing operation may become particularly critical.

Various technical problems arise in respect of sequencing, which various known approaches are aimed at improving, but in a not totally satisfactory way.

Generally, the known FMS systems envisage the presence of several redundant sequencing systems. Comparison of the guidance commands then implies a necessary dependency between the various redundant entities of the system. This interdependency may lead to common errors and/or to the propagation of errors.

A known solution according to the prior art is described in patent document U.S. Pat. No. 8,660,715 which discloses a method and device for automatically monitoring air operations requiring a guarantee of navigation and guidance performance. The device described relies on a specific system, architectured according to a dual model (i.e. redundancy, with two independent navigation chains). In such an architecture, a fault in the system on one of its chains (or "sides")—implying the undesired modification of the trajectory to which the aircraft is slaved—must be able to be detected and above all isolated so as to pursue the flight on the no-fault side. The approach described in the prior art comprises means for carrying out monitoring, so as to verify whether the two flight management systems in this specific configuration are in a condition to operate or to continue to operate in dual mode. This approach comprises limitations.

A need exists for advanced systems and methods for managing the sequencing of the flight plan of an aircraft.

SUMMARY OF THE INVENTION

The invention relates to a method for manipulating aircraft flight plan segments. A result of an avionics calculation, such as a flight plan sequencing, is selected from among a plurality of results determined by a plurality of systems executed in parallel and placed in competition, each system communicating to at least part of the other systems conditions to be satisfied by the result of a calculation, the method comprising the steps consisting in that a given system from among the plurality of systems shares its own calculation result with at least one other system if and only if its own calculation result satisfies the conditions received from at least one other system. Developments describe in particular various modalities of negotiation and/or selection of the results, the switch to independent and/or the deactivation of a system, voting and/or weighting mechanisms. Software and system aspects are described.

Advantageously, the system according to the invention implements a plurality of independent systems, thereby avoiding common points of mistakes or of errors in the sequencing.

Advantageously, certain embodiments of the invention make it possible to "secure" the sequencing, that is to say makes it possible to prevent an error in a given system from propagating onto the other system(s) of the overall system.

Advantageously, the invention uses independent systems placed in competition, which each sequence independently and which coordinate with one another (in fact, i.e. with no necessity for a centralizer member). The prior art describes systems of master-slave type, i.e. situations in which one system enslaves another, with predetermined roles. By contrast, in the invention, the role of master and/or of slave need not be pre-allocated. The allocation of the roles is in fact performed, i.e. on account of the negotiation between peer systems. This solution is more robust and secures the sequencing.

Advantageously, by differently managing the sequencing of a flight plan and/or of a trajectory of two or more redundant entities of flight management systems, the embodiments of the invention make it possible to procure better continuity, integrity and precision of guidance along the flight plan and/or trajectory.

Advantageously, an embodiment of the invention allows precise guidance of the aircraft, while increasing the level of integrity and continuity of the flight management system.

Advantageously, the invention can take into account a variety of calculation errors in the flight management system so as to sequence the flight plan.

Advantageously, certain embodiments of the invention are of predictive rather than reactive type. Reliability is generally increased. Certain embodiments of the invention make it possible in particular to avoid untimely switches to "independent" due to real time.

Advantageously according to the invention, the sequencing can be quasi-simultaneous (i.e. in predictive, rather than reactive, mode). The sequencing in parallel of the various entities of the flight management system generally makes it possible to carry out guidance on identical active flight segments and therefore makes it possible to calculate a guidance directive that diverges very little between the various entities of the system. This small difference makes it possible to set up comparison thresholds in the monitoring part with low values and therefore to alert the pilot very rapidly as soon as a fault occurs.

Advantageously, the invention makes it possible to achieve objectives termed "hazardous" in respect of integrity and of continuity objectives, in particular by means of the use of redundant entities which monitor one another, and guidance performance objectives. For example, the exit alert for a 2-RNP corridor does not take place when the aircraft exits the corridor, but the fault must be detected before, for example when the guidance command tends to induce exit from this corridor.

Advantageously, the embodiments of the invention are applicable to avionics architectures comprising multiple entities (two or more), in particular of dual type.

Advantageously, the embodiments according to the invention can be scalable, by using more than two entities in parallel.

Advantageously according to the invention, a faulty entity can be isolated or excluded from the calculation pool.

Advantageously, the embodiments of the invention are applicable to avionics architectures comprising a sequencer outside the flight management system FMS (for example within an automatic pilot.)

BRIEF DESCRIPTION OF THE FIGURES

Various aspects and advantages of the invention will become apparent in support of the description of a preferred but nonlimiting mode of implementation of the invention, with reference to the figures hereinbelow.

DETAILED DESCRIPTION

Figure 1:
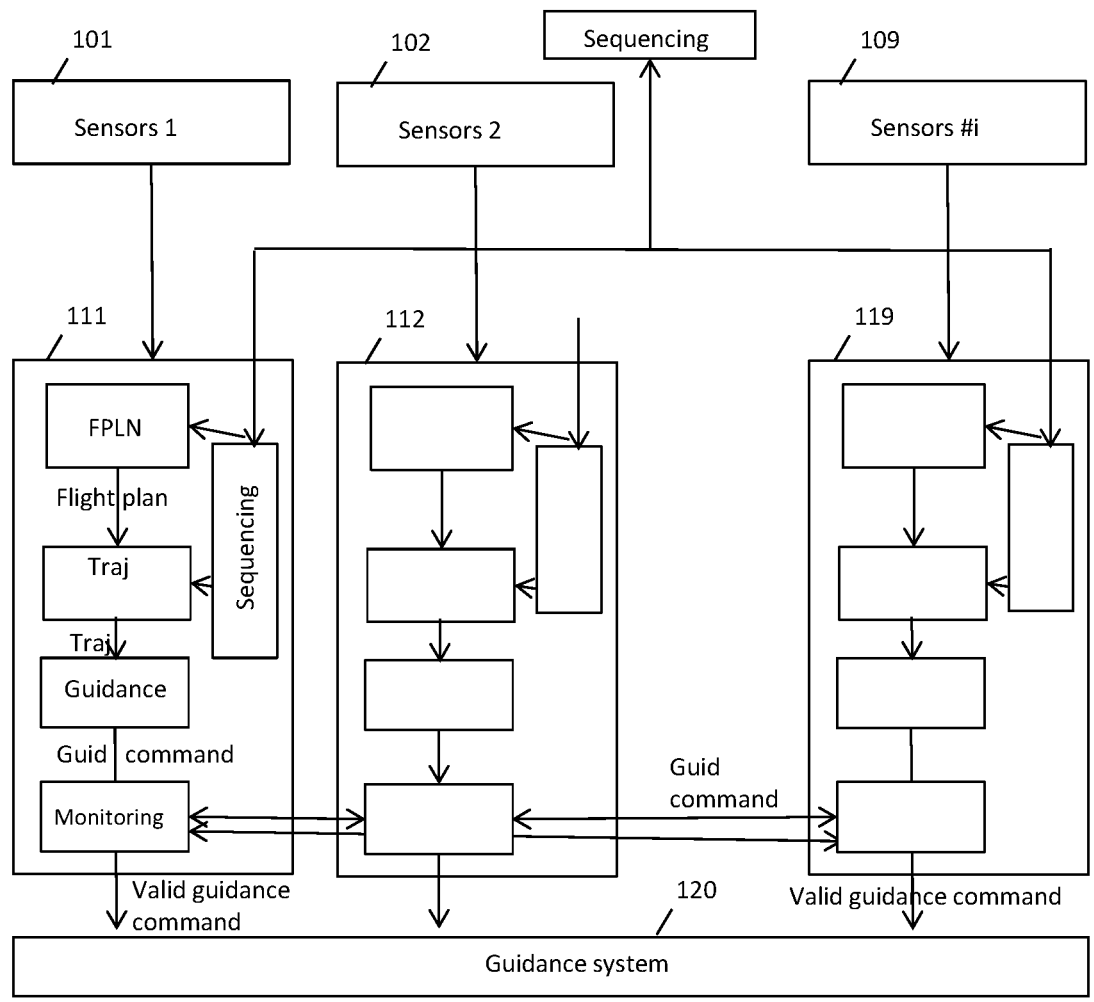
FIG. 1 shows an exemplary overall system according to the invention.

Definitions are proposed hereinafter.

The term "leg" corresponds to a flight plan segment.

The verb "sequence" corresponds to the act of changing the flight plan segment to be flown (from the "current/active leg" to the "next leg").

The term "Flight plan" refers to the list of 2D, 3D, 4D or 5D elements defining the planned route. The elements making up the flight plan are "legs" (e.g. pseudo-trajectory segments standardized by ARINC 424), flight plan points (or "waypoints"), altitude or speed constraints, altitudes, etc. The flight plan is a chaining or stringing together of elements extracted from a navigation database, or input by the pilot or else downloaded. One speaks of a 2D flight plan when these elements contain only characteristics in the horizontal plane. A 3D flight plan adds vertical and/or speed characteristics. A 4D flight plan adds transit time constraints. A 5D flight plan makes it possible to manage the fuel dimension too.

The term "Trajectory" refers to the list of continuous and flyable elements (continuity of derivative and derivatives compatible with the aircraft's flight mechanics). A 2D trajectory consists of straight and curved segments strung together in a continuous manner.

The term "Flight Management System" (acronym FMS) refers to an on-board avionics system. One of the main functions of a flight management system is to guide the aircraft along the flight plan. One of the objectives of the FMS is in particular to assist the pilot during the flight; for example by managing and by displaying the route to be followed ("Flight plan"), by calculating the trajectory (e.g. flyable continuous locus) to be followed in order to perform the flight plan; by calculating guidance directives for the following of this trajectory by the automatic pilot (optional characteristic); by estimating transit times and a fuel consumption; by receiving and dispatching flight plan elements to the others to other systems; by displaying the positions and estimate of precision of the location systems. To ensure the safety objectives assigned to the system, the latter can be composed of one or more entities, thereby making it possible to increase availability (and continuity), as well as integrity (by mutual monitoring). In particular, the "sequencer" may or may not form part of the flight management system.

The availability and integrity requirements in respect of a flight management system FMS are drastic.

In particular, events regarding losses or errors relating to the flight plan and/or to the trajectory are feared. It is generally required to demonstrate that the probability of occurrence of these events is less than $10^{-5}$. Concerning the platforms for which the probability of error is less than this threshold value, it is necessary and sufficient to demonstrate that the hardware is sufficiently reliable.

Recent upgrades in respect of air navigation procedures are nonetheless leading to a strengthening of the requirements related to continuity, integrity and precision of guidance along a flight plan and/or trajectory. More particularly, setting up procedures of RNP AR type ("Required Navigation Performance Authorization Required") according to a performance level of less than RNP 0.3 NM (nautical mile) demands an integrity and a continuity of guidance with a parametrization (or "containment" to use aeronautical jargon) of 2*RNP consistent with a fault condition classification of "hazardous" type. The precision of the guidance must also be more precise so as to make it possible to remain in a 1×RNP corridor around the trajectory.

These procedures of RNP type are characterized by i) the ability to navigate according to a flight plan comprising flight plan points ("waypoints" defined in a database), and not according to ground beacons, ii) according to a corridor of semi-width RNP in which the aircraft must lie 95% of the time and a "containment" corridor of semi-width 2*RNP (with a "buffer", that is to say a margin), iii) the necessity to estimate the aircraft's location performance on board and iv) the implementation of an on-board monitoring device comparing the location performance with the performance required in the database procedure.

The RNP AR procedures necessitate special authorization, procedure by procedure. They furthermore necessitate qualification of the crew. These procedures make it possible to have RNPs of less than 0.3 and therefore necessitate heightened monitoring of the systems from a technical point of view. Aircraft faults must not cause the 2RNP corridor to be exited (e.g. presence of relief at 2RNP from the reference trajectory i.e. more "buffer").

Most known RNP AR solutions make it necessary to rely in part on means for managing faults ("mitigation"), in particular by training the crew in each particular procedure, and also according to schemes of a technical nature.

In order to minimize the recurrent cost related to procedure by procedure certification, it is advantageous to be able to rely on an avionics architecture making it possible to directly demonstrate the safety and precision objectives demanded by RNP AR regulations.

On current aircraft, the monitoring of the RNP AR operations is carried out by way of two standard functions. A first function monitors the precision and the integrity of the position calculation. A second function allows the crew to monitor the guidance of the aircraft.

Within this RNP-AR framework, from among the various monitoring necessary for achieving the safety objectives, the fine monitoring of the guidance directives emitted to the automatic pilot is decisive since it makes it possible to anticipate corridor exits in the case of an error with the flight management system (i.e. a "mistake").

The term "sequencer" refers to the algorithms or class of algorithms determining or calculating the sequencing condition of an element of the flight plan and/or of the trajectory and dispatching the sequencing event to the appropriate entities of the flight management system. The term "sequencer" can correspond to a device implementing the sequencing steps, nonetheless the physical delimitations of this device can be variable or indeed irrelevant (for example in the case of a distributed system); in such cases, the term "sequencer" corresponds to the level of supervision (intended) or of consolidation (in fact) of the various peer systems.

The term "Guidance" refers to algorithms making it possible to slave an aircraft to a planned trajectory. Guidance algorithms implement autocontrols having as input an active element of a trajectory or flight plan and the position measured by one or more sensors of the aircraft. These guidance directives generally comprise a) a roll directive, an angular roll rate or a trajectory segment for guidance in the horizontal plane; b) an attitude, an attitude delta, an angular pitch rate, a load factor, a vertical acceleration, a vertical speed, a slope, or a trajectory segment in the vertical plane; c) a speed, an acceleration, a total energy, an engine directive (N1, EPR, PLA), a temporal time objective for the guidance in terms of speed.

Accordingly, the flight management system determines or calculates one or more guidance directives which are transmitted to the automatic pilot. To determine a guidance order or a directive, the steps generally comprise the steps consisting in acquiring parameters formulated by sensors often outside the flight management system (such as position of the aircraft, speed, altitude, heading, ground track, vertical speed, slope, accelerations, angles, angular rates, . . . ), in determining or formulating the flight plan by manual input and/or by downloading (the flight plan thus constituted comprising a list of "legs" that have to be strung together in a chain such as a "skeleton" which serves as support to the trajectory); in determining the trajectory of the aircraft on the basis of these elements of the flight plan (e.g. calculation of a succession of elements strung together in a continuous manner and above all in a flyable manner i.e. with respect to the performance of the aircraft); determination of the position of the aircraft on the basis of the various on-board sensors (advantageously, the embodiments of the invention use satellite-based position sensors, which can be hybridized with inertial platforms to provide very precise location information); finally, the flight plan and the trajectory thus determined are sequenced. This entails, in particular, determining which leg of the flight plan or which trajectory segment is "active" with respect to the position of the aeroplane. The flight management system verifies in a cyclic manner (typically every 120 milliseconds) where the aeroplane is situated with respect to the flight plan and to the trajectory. When the aeroplane has passed beyond the end of the active current leg or segment, it sequences this active leg/segment and the next leg/segment becomes the new active leg/segment. The active leg/segment becomes the new reference which will be displayed to the pilot and used as reference for the guidance. The guidance properly speaking establishes the disparity between the active leg or segment by using the previously calculated position and the aircraft speed-vector information provided by the sensors. From this it deduces, by algorithms of slaving type, a guidance directive. Finally, the guidance directives are communicated to the automatic pilot.

FIG. 1 shows an exemplary overall system according to the invention. The figure shows an overall system comprising a plurality of systems (111, 112, . . . 119), also called "entities" subsequently. The systems (111, . . . 119) each determine a candidate for the next flight plan segment to be flown, as a function of the aircraft parameters and of the sensors individually associated with them (101, 102, . . . 109). These systems (111, 119) are "synchronized" by way of the guidance system 120 (since they share one and the same active or current flight segment, i.e. actually flown by the aircraft at a given instant).

The entities or systems (111, 112, . . . 119) can be independent and/or redundant (and/or implicitly fallible).

The independence of the systems means that the systems can accomplish their calculations without referring to the others, or at least without depending thereon for these precise calculations (stated otherwise each system can autonomously determine its own candidate segment). The independence is generally not absolute in so far as the systems may share certain electronic circuits, hence common, or indeed common power supply sources. Diverse and additional points of synchronization, not described here, may exist between two or more of the systems according to the invention. In certain embodiments, the unique-fault points are minimized as far as possible (separate power supplies etc).

The systems according to the invention are generally redundant, hardware-wise and/or logically (e.g. functionally). In certain embodiments, the systems are strictly identical. In other embodiments, their function is identical (while their intimate hardware structures may vary, precisely so as to afford robustness to faults). In certain embodiments, the software code executed by various systems may be different.

The systems implicitly are fallible, in the manner of any hardware system, i.e. are susceptible to faults or to failures (according to various causes or modalities).

The systems according to the invention are generally executed in parallel, and therefore in fact "placed in competition" from the point of view of a higher level of aggregation (that each system "ignores" this situation or "ascertains" it, the latter case possibly involving internal optimizations in a system if appropriate.

For reasons of availability, integrity and continuity, it is advantageous to implement a plurality of systems. A multiplicity of entities confers redundancy and therefore robustness to faults.

To prevent the multiple entities of the system from diverging, synchronization mechanisms can advantageously be set up between these entities.

In one embodiment, the same active or current flight plan element or segment is received by the various entities or systems placed in competition. Consequently, the entities concerned sequence substantially at the same time and the guidance commands arising from the guidance system 120 and calculated by each entity will be able to be compared so as to monitor the system.

Figure 2:
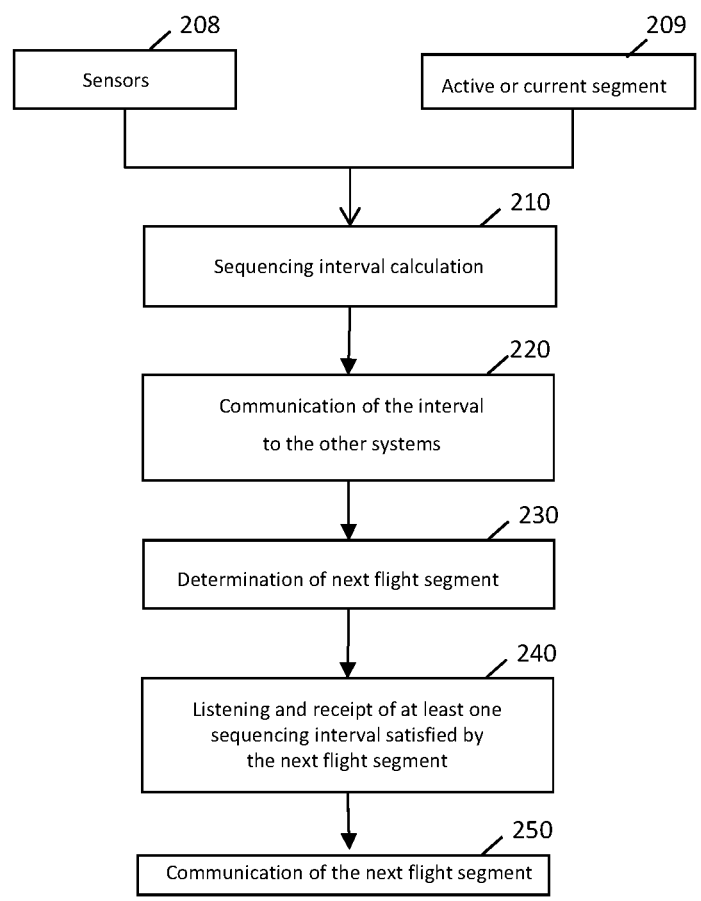
FIG. 2 shows examples of steps of the sequencing method according to the invention.

FIG. 2 shows examples of steps of the sequencing method according to the invention.

In one embodiment of the invention, the emergence of a sequencing result is the product of a result of negotiation between peer systems. Examples of steps are described hereinafter.

In a first step 210, at least one system from among the plurality receives the active or current flight segment 208 as well as the position provided by the position sensor 209 (which is associated with the flight management entity). The entity determines ("arms" or "sets") a sequencing interval (or "window").

In a second step 220, the sequencing interval is communicated from peer-to-peer to the other systems among the plurality, which perform the same first step on their side. The communication is performed either in a distributed manner (with no central member), or is centralized via an intermediate regulating member (sequencer for example). A hybrid mode combining distributed and centralized communication is also possible.

In a third step 230, at least one system can determine the next flight plan segment. The system does not communicate its result (if it determines it).

In a fourth step 240, the system considered listens i.e. receives the intervals communicated by the third party systems.

In a fifth step 250, when a given system communicates the result of its sequencing (if it has determined it) if and only if this system receives from a third party system an item of information according to which its result satisfies this third party system's sequencing interval. The communication of the valid result can be performed in distributed mode (e.g. via the network of peers, according to a variable topology, variable connectedness graph) and/or centralized mode (e.g. via the sequencer).

In a variant embodiment, when a sequencing event is published, each redundant entity of the system sequences a new active flight plan element and/or trajectory, if only if it has previously armed its sequencing. Stated otherwise, one or more systems can condition the calculation of their next flight segment to the very fact of having received information from the other systems and/or of having finalized their own determination of a sequencing interval.

Generally the determination of a sequencing interval and the determination of a sequencing (of a flight plan segment) may be independent operations (even if they may be related in other cases), therefore leaving room for various variant embodiments. Stated otherwise, an independence may exist between the calculation of the arming condition and the sequencing event, thereby making it possible to secure the sequencing by demonstrating that the probability of occurrence of a mistake in calculation of the arming and of the sequencing event is the multiplication of the probabilities of a mistake in the 2 entities calculating these 2 conditions. This probability therefore becomes very low, of the order of $10^{-5}*10^{-5}=10^{-10}$, thus making it possible to demonstrate the "hazardous" avionics context ($10^{-7}$).

Figure 3:
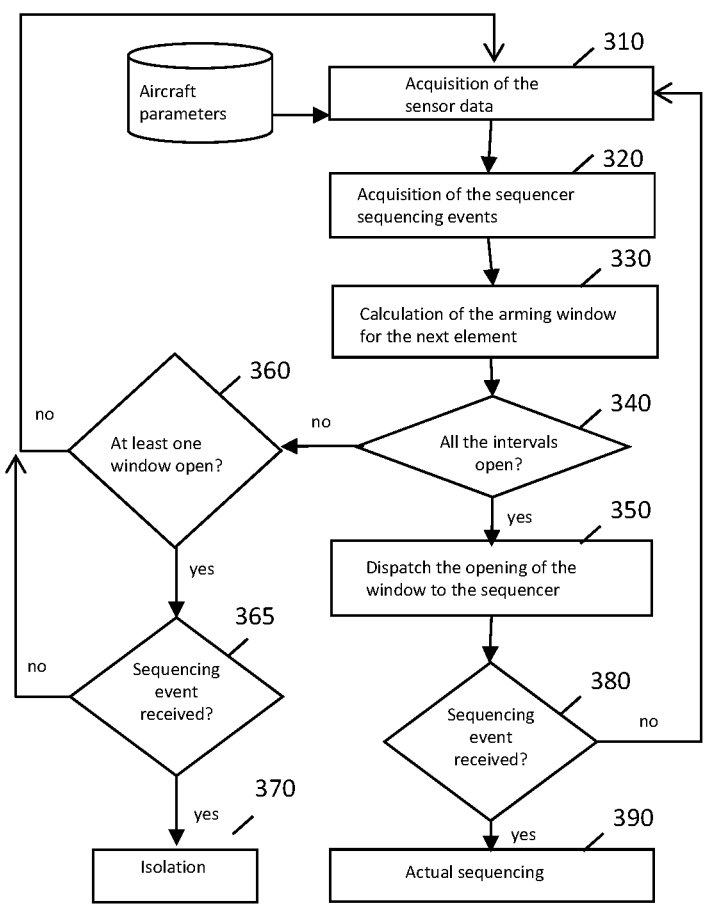
FIG. 3 shows examples of steps of the method according to a specific embodiment of the invention employing a sequencer.

FIG. 3 shows examples of steps of the method according to a specific embodiment of the invention employing a sequencer.

The steps described hereinafter illustrate variant embodiments as regards the details of the steps (for example in respect of tests aimed at establishing the completeness of the states of the sub-systems involved, etc).

In one embodiment of the invention, the selection of a "final" sequencing result is the product of an inter-peers negotiation result managed by a central member or centralizer. This member can be integrated into one of the instances 111, 112 . . . 119, or else be external. Such a member is advantageous in so far as it becomes possible to supervise the whole collection of systems placed in competition (e.g. isolation, exclusion, etc). Examples of steps are of this specific embodiment are described hereinafter.

In a first step, the sequencer undertakes the acquisition of the sensor data 310 (i.e. the set of data which are used). Thereafter (or earlier or even simultaneously) the sequencer undertakes the acquisition of the sequencing windows 320 dispatched by each of the entities of the flight management system. The sequencer thereafter determines the condition of sequencing of the next element in step 330. This is followed by a test 340 on the sequencing conditions of the next element and as regards the fact of knowing whether all the windows have been received and opened from the various entities of the flight management system.

If the response to the test 340 is negative, it is determined if at least one of the windows is open 360. If no interval is open, step 310 is repeated. If at least one interval is open the information is inconsistent (since certain intervals are moreover closed). A second test 365 is therefore undertaken to ensure that no instance will ask to sequence on this inconsistent basis). If a sequencing event is dispatched to the entities, those which do not have any open interval are isolated (step 370), being suspected of poor operation. By default the information is consistent and the sequencing is not actually undertaken, and the method returns to step 310.

If the response to the test 340 is affirmative, all the information is consistent and the sequencing is ordered and dispatched 350 to the sequencer (e.g. to the FMS and thereby, the sequencing is performed in actual fact 380, 390).

Figure 4:
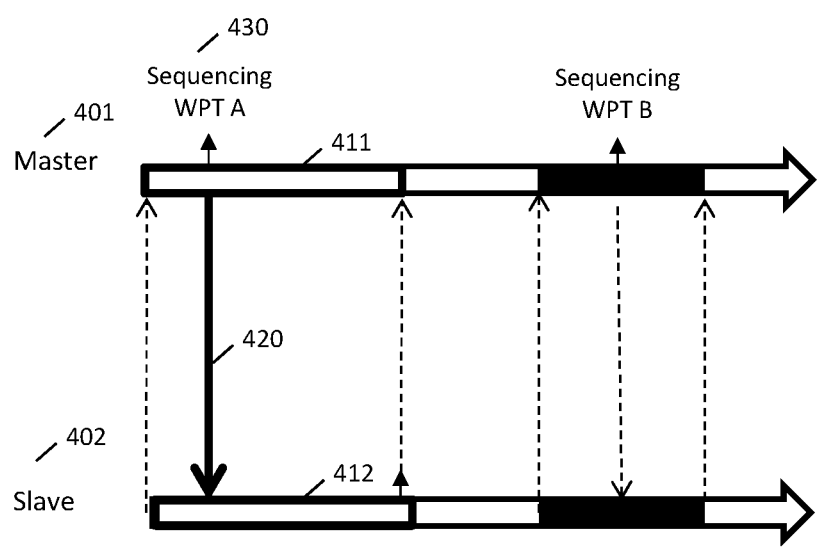
FIG. 4 shows the steps of the method according to the invention taking place in a dual system.

FIG. 4 shows the steps of the method according to the invention taking place in a dual system.

Indeed, in a development, the system according to the invention may be a system of "dual" type, one of the two entities (or independent system) being the master 401 and the other entity being the slave 402.

Advantageously, by using this dual configuration, it becomes possible to increase the integrity of the guidance (e.g. it can be demonstrated that the probability of error is less than $10^{-7}$).

The master system 401 determines the next segment 430 (i.e. sequence, emission of the sequencing event by the Master) if the said master system is in the sequencing window 412 received from the slave system (i.e. the master system is strengthened in its calculation).

The slave system for its part receives this segment 430 determined by the master system and then executes its sequencing if it is in its own sequencing window. In the nominal case, the slave system will find the same result. By default, the slave system can pass to "independent" mode, as it is called in FMS terminology, for example if it sees a master system sequencing request arrive outside of its sequencing window. If the master system 401 calculates a sequencing event and if the window of the slave system 412 is closed, the master system can itself pass to so-called independent mode, i.e. no longer listen to the slave system.

In one embodiment, the master system and the slave system can switch, automatically or on manual selection (pilot).

When the dual mode can no longer operate, for example in the case of an operating fault of the digital link between the two entities, each entity can revert to being independent and perform its calculations separately without mutual synchronization (degraded mode).

Other embodiments are described hereinafter.

Generally, there is described a flight management system of an aircraft requiring an at least "hazardous" level of continuity and of integrity while demanding precise performance in respect of guidance along a flight plan or trajectory. In a development, the flight plan and/or trajectory sequencing system implements a sequencing method or software ("sequencer") and/or flight management software, with multiple instantiation of this software in one or more physical entities on one or more hardware platforms (independent systems). The method comprises a synchronization of the sequencing by the step consisting in determining, by each of the independent systems, or at least some of them, a sequencing window (e.g. sequencing conditions) and by the step consisting in executing the sequencing ordered by the sequencer in the set of entities when the latter (in interaction) see a sequencing event arrive in the sequencing window (the determination of a sequencing be performed by one of the independent systems). If and when the sequencing request and the sequencing window are inconsistent, the entity or the independent system that detected an inconsistency can be isolated. In a development, the sequencing window can be of temporal nature. In a development, the system is of "dual" type, i.e. comprises two independent systems, each of the two entities calculating a sequencing window and a sequencing event. Each entity dispatches its start and end of sequencing window to the other entity. Each entity executes its sequencing only if a sequencing window has been opened by the opposite entity. In a development, a switch to so-called "independent" mode is performed when one of the independent systems receives the determination of a sequencing by the adverse system which does not verify its own sequencing window.

In another embodiment, not represented, it is advantageous to use three (or more) independent systems to increase the integrity level. This system is termed "triplex", i.e. comprising three entities, one of the two entities being "master" and at least one of the other two entities being "slave" (the third entity being able to be on standby waiting to take the role of one or of the other in case of a fault).

If appropriate, a comparison is then performed between certain calculation results of at least two entities. In general, the absolute value of the difference of the results to be monitored is determined and then compared with a predefined threshold (or with a span of thresholds). When this value is greater than this threshold for a duration greater than a predefined duration, an alert may be emitted to notify (the pilot and/or a third party system) of a malfunction of the monitored entity. In one embodiment, e.g. in certain flight or required navigation precision contexts, the various results can be retrieved for the pilot, visually juxtaposing them for example.

Examples of sequencing situations comprising errors or failed systems are described hereinafter.

An error may occur in the sequencer. For example if a calculation error occurs in the sequencer and if this event is not calculated (or poorly calculated and therefore emitted outside of the sequencing window such as calculated by the other entities), the sequencing command will not execute on the other entities. An entity which has received the erroneous sequencing event (or has not received any sequencing event in its sequencing window) may ask to isolate itself from the sequencer.

An error may also occur in a system which is listening, i.e. which receives sequencing intervals and/or flight plan segment proposals on the part of one or more adverse systems. For example, if an error (e.g. of calculation) occurs in an entity which is listening and if this entity carries out an erroneous calculation of the sequencing arming window (or does not arm this sequencing, i.e. does not verify this window versus the active segment), the sequencer may receive a sequencing window which is inconsistent with its own calculation and the entity considered may be isolated (by the sequencer or the entity isolating itself routinely).

An error may occur in respect of transmission of a sequencing event (for example a sequencing window: may not be received by the listening entities, or else the window in question may not be received by the sequencer).

Other embodiments and generalizations of the invention are described hereinafter.

According to one aspect of the invention, a plurality of peer systems ("all equal" and independent of one another, or at least mutually independent), execute trajectory calculations and flight plan manipulation calculations independently of one another. In particular, each independent system undertakes a trajectory calculation and/or a candidate sequencing. Each independent system determines in particular one or more validity intervals of a sequencing. In another phase (later or carried out concomitantly with the calculations) each independent system communicates the results of its own calculations to the other independent systems and listens to the results calculated by its peers. This results in a negotiation step or phase, which may be asynchronous since each independent system may not determine its own result at the same time. Various modalities of selecting a result in particular from among the calculations performed by the various independent systems may be implemented (for example i) selection of the first result available in the course of time, ii) selection of the first result determined as being valid by considering criteria predefined in an absolute or invariant manner, iii) relative comparison of the various results available as a function of other criteria, in particular dynamic or changeable in the course of time, iv) weighting of the results as a function of quality or reliability criteria in respect of the independent systems that communicated the results, etc).

In one embodiment, there is disclosed a method for managing flight plan segments of an aircraft in a flight management system comprising a plurality of independent (of one another) systems, the method comprising the steps consisting in: in each independent system, determining conditions of change of flight plan segment, the said conditions comprising a validity interval which is configurable in terms of time and/or distance; by each independent system, communicating to the other independent systems the window determined by it; receiving a published sequencing request, the said request determining the next flight plan segment to be flown and published; in each independent system, determining (independently) the next flight plan segment to be flown (candidate) by verifying the next flight plan segment to be flown as published and the conditions of change of flight plan.

Generally, there is disclosed a method (for example implemented by computer) for selecting an avionics calculation result from among a plurality of results determined by a plurality of systems executed in parallel and placed in competition, each system communicating to at least part of the other systems conditions to be satisfied by the result of a calculation, the method comprising the steps consisting in that a given system from among the plurality of systems shares its own calculation result with at least one other system if and only if its own calculation result satisfies the conditions received from at least one other system.

The systems executed in parallel are redundant, (implicitly) fallible and independent.

Stated otherwise, in one embodiment, according to a high level of abstraction and from the point of view of a given system from among the competing systems according to the invention, i) a calculation result is determined by the given system, ii) conditions (adverse) which must be satisfied by the calculation result determined by the given system are received by the given system (from a system other than the given system) iii) if and only if this result satisfies the adverse conditions then the result determined is considered to be valid and is communicated to the supervisor of the competing systems.

In a development, the avionics calculation is a calculation of change of flight plan segment.

There is disclosed in particular a method for manipulating aircraft flight plan segments—implemented in a system (or several systems, or each system from among a plurality of systems executed in parallel and placed in competition-, the method comprising the steps consisting in: determining a next flight plan segment to be performed (or "candidate") knowing the active flight segment of the aircraft, the said next flight plan segment determining a junction point corresponding to the end of the active flight plan segment and corresponding to the start of the said next flight plan segment to be flown; determining a "sequencing" (i.e. an interval of "change of flight plan segment" (or more generally sequencing "conditions"), the said interval comprising at least one start, this start of the interval being situated before the junction point; communicating, to at least one other system (or each system from among the plurality), the said interval of change of flight plan segment determined.

The flight plan segment which is flown by the aircraft at a given instant is called the "current" segment or "active" segment. Various legs are successively flown and in fact a sequencing (change of leg) may be performed (or detected or initialized or determined). The indication of change of active leg may for example originate from the detection of a change of trajectory which becomes equal to the trajectory envisaged after change of leg.

Each independent system determines a "sequencing window", i.e. conditions under which the next flight segment to be flown may be determined. A sequencing window is likewise also called a "validity interval" (of a sequencing). A sequencing window comprises sequencing conditions.

In the secondary details, an interval can be defined in time and/or in space. A sequencing interval (or sequencing window) can comprise data of space type and/or of time type. For example a sequencing window can comprise a start and an end, expressed under the angle of time ("when", i.e. clock) or else of space ("where", i.e. place or locality or location).

Stated otherwise, a sequencing interval comprises a start marker and an end marker determining the validity of a given flight plan segment change.

Concerning the temporal expression of the sequencing window, a variant embodiment envisages the use of the so-called "final update" mechanism, which is a precise temporal instant defined according to a proprietary mechanism. This mechanism consists in geometrically freezing the trajectory element a few seconds before the (actual) transit of the aircraft over this new element, the precise definition of a curved trajectory segment necessitating knowledge of the speed and the wind at the time the segment is flown. This action is generally performed twelve seconds before the sequencing of the following element (modulo an additional duration dependent on the geometry of the element and the speed of the aircraft). In a variant embodiment, this particular instant of the "final update" is used to determine the limits of the sequencing interval.

A flight plan segment to be flown determines a "junction point" corresponding to the end of the current (or active) flight plan segment and corresponding to the start of the said next flight plan segment to be flown. The start of the sequencing window is situated upstream of the "junction point": the sequencing has not yet taken place. The end of the window may be on or after (time) or downstream (distance) of the junction point.

In a development, the method furthermore comprises the step consisting in receiving, in (or by) at least one (first) system from at least one other (or second) system, the said interval of change of flight plan segment.

In one embodiment, each independent system communicates its start and its end of sequencing window to each of the other independent systems. In one embodiment, if and/or as soon as possible, a system implements the method and communicates (if appropriate) the result of its calculation to at least one other competing system (or to all, if possible).

In a development, the method furthermore comprises the step, in at least one system, consisting in determining a next candidate flight plan segment if the junction point of the said candidate flight plan segment is situated in an interval communicated by at least one other system.

In at least one of the systems from among the plurality of competing systems implementing the method, a change of candidate flight plan segment is determined if and only if this change of candidate flight plan segment is situated in the window determined by the said system and if the candidate sequencing is situated in a window communicated by at least one other system.

The various peers all made equal each individually determine "their" next flight plan segment and these determined segments are compared to one another in an iterative and collective manner. A "negotiation" is commenced, and a final or negotiated flight plan segment is produced or "emerges". The determination of a flight plan segment is performed well upstream of the junction point ("consistency" test).

For example, in an overall system comprising three equal independent systems, if a first independent system determines a candidate sequencing first, then a second independent system may indeed verify that the sequencing conditions are properly fulfilled for this candidate sequencing and the current flight plan segment; it then determines a final sequencing. The third independent system may not satisfy the conditions or satisfy them subsequently: hence, the third independent system does not determine any candidate sequencing (it remains silent).

The prior art generally proceeds by i) vote(s), according to ii) pre-established roles or priorities or hierarchies (for example master-slave). By contrast, the invention proceeds from a mechanism comprising a) factual tests or comparisons conducted by peer systems b) considered to be equal. In one embodiment, the first manifestation which is conclusive (for example in the course of time) of one of the peer systems and "placed in competition" can carry the determination of a sequencing in the overall system. This determination by peer-to-peer negotiation (emergence of a result obtained in a collective manner) may optionally be modulated or optimized by weightings or hierarchies or scores or criteria associated with the weight of each of the independent systems in the overall system (indeed, certain independent systems may exhibit variable reliability indices).

In a development, the method furthermore comprises the step, in an at least one system, consisting in communicating the next candidate flight plan segment, the said segment becoming the selected flight plan segment.

In a first situation, if the active leg is in the sequencing window and if at least one other independent system has communicated sequencing conditions which are validated for the active leg then the independent system considered "sequences" in an effective manner, i.e. communicates to the over-system the next candidate flight plan segment (for example the flight management system), which thereby becomes the next final flight plan segment.

In a development, the method furthermore comprises the step, in at least one system, consisting in receiving from another system an interval of change of flight plan segment as long as the said at least one system has not determined any interval of change of flight plan segment and furthermore comprising the step consisting in deactivating one and/or the other of the said of the two systems.

In a development, in at least one of the systems, the method comprises the step consisting in receiving a sequencing interval from another system whilst the system does not calculate any sequencing condition and comprises the step consisting in deactivating one and/or the other of the said of the two systems.

One of the two independent systems has failed, or both have failed, without it being possible to determine which one without further information. The pilot in practice is notified of the failure or of the indeterminacy; he cannot generally choose and is therefore led to a manual intervention or to recourse to a third party system (for example to a third independent system). Frequently, when uncertain, the pilot will increase the altitude of the aircraft.

In a development, the method furthermore comprises the step, in at least one system, consisting in receiving the determination of an interval of change of flight plan segment from another system whilst the said system has not determined any interval of change of flight plan segment and furthermore comprising the step consisting in deactivating one and/or the other of the two systems.

In a development, the method furthermore comprises the step, in at least one system, consisting in receiving the determination of a sequencing condition from another system whilst the said system does not have any open sequencing window and comprising the step consisting in deactivating one and/or the other of the said independent systems.

One and/or the other of the independent systems concerned has therefore failed and each of the systems continues to calculate independently, without continuing to communicate with one another any more (the exchanges with the other independent systems may nonetheless continue). Optionally, in a manner identical to the previous situation, the lack of agreement between the independent systems considered can be notified to the pilot, and he can be prompted with the various proposed alternatives (without the overall system being able to decisively conclude which one of the candidate flight plan segments is valid and which one is erroneous).

In a development, the method furthermore comprises, for an independent system, the step consisting in not or no longer receiving the sequencing conditions of one or more systems.

An independent system according to the invention may not receive the sequencing conditions of one or more systems. An independent system according to the invention may no longer receive the sequencing conditions of one or more systems, for example after having received one or more times the sequencing conditions of third party systems.

In a development, the method furthermore comprises the step, for a system, of not or no longer communicating the candidate flight plan segment obtained.

An independent system according to the invention may no longer determine a change of flight plan segment, for example after having to have determined one or more of them. Predefined thresholds may define the minimum and/or maximum number of contribution of a given independent system.

In a development, the method furthermore comprises, for a flight management system FMS associated with or comprising the plurality of independent systems, the step consisting in isolating, excluding or shutting down one or more systems.

The flight management system grouping together the various independent and competing systems may isolate or exclude or deactivate one or more independent systems, for example as a function of additional information (levels of confidence, of reliability, of service quality etc). The term "isolate" signifies that the FMS system can continue to monitor the results arising from an isolated system, and optionally to take them into account as a function of predefined criteria and/or contexts. The term "exclude" signifies that the FMS system can ignore the results arising from an isolated system, whilst another avionics system will still have access thereto for example. The term "shut down" covers various situations, comprising the suspension (temporary shut-down), the rebooting (temporary shut-down) or the complete shut-down of the independent system considered (permanent shut-down).

In a development, the method furthermore comprises the step consisting in displaying to the pilot one or more indications relating to one or more isolated or excluded or shut-down systems.

Since a system deemed to have failed can be rebooted, the total number of activated systems within the flight management system can therefore fluctuate in the course of time. Advantageously, this dynamic countdown is notified to the pilot.

In a development, a sequencing interval is of temporal type, the start of the window interval corresponding to the so-called "final update" event and the end of the window being dependent on the geometry and on the speed of the aircraft.

The "final update" event freezes the definition of the following active segment. The start of the sequencing window is generally of the order of 12 seconds, modulo a duration related to the geometry and the speed of the aircraft. The end of the sequencing window is generally of the order of 20 seconds, modulo a duration related to the geometry and the speed of the aircraft.

In a development, a sequencing window is of composite type, the said composite type combining aspects of time and of space.

For example, a window of hybrid type will correspond to a definition "minimum value between 5 seconds and 1 nautical mile NM", this definition making it possible advantageously to take into account the dynamics of the aircraft.

In a development, the method furthermore comprises the step consisting in displaying to the pilot of the aircraft the flight plan segment selected from among the flight plan segments determined.

In a development, the sequencing interval is configurable or dependent on the RNP value.

For example, the start and end values of the interval or of the window may be dependent on the value in nautical miles of the RNP AR (i.e. according to a small or a wide corridor, for example 400 metres).

In a development, each system is associated with a predefined parameter, the method furthermore comprising the step consisting in weighting the results of the systems by the said predefined parameters.

The parameter associated with each system can represent the priority or the weight or the reliability or the confidence level which is associated with the system considered. Stated otherwise, the inter-peers negotiation scheme described can be modulated by the application of weightings, each system then no longer being considered to be the equal of another. A particular system may exhibit better characteristics in respect of precision of calculation and in particular of location (the GPS sensors, the inertial platforms may vary in performance).

In a development, the said weighting comprises mechanisms for voting according to predefined thresholds or predefined spans of thresholds.

In particular, blocking minorities and/or majorities may be implemented, also opposable rights of veto etc.

There is disclosed a computer program product, the said computer program comprising code instructions making it possible to perform the steps of the method, when the said program is executed on a computer.

In one embodiment, the method according to the invention may be implemented in the software of the FMS flight management system.

In one embodiment, the system according to the invention comprises several redundant entities and a sequencer (or sequence entities mon) which determine the sequencing conditions. Hardware-wise, this sequencer may be implemented as part of the flight management system or be exterior to it.

In one embodiment, the method according to the invention may be employed in a guidance system and/or in an automatic piloting system (which has received the flight plan and/or the trajectory to be sequenced).

In a development, the system comprises a number N of systems, one of the systems being of master type and the N−1 remaining systems being of slave type, a system of master type not requiring to receive a sequencing interval from a system of slave type in order to determine its next flight plan segment and a system of slave type requiring the receipt of a sequencing interval from a system of master type in order to be able to determine a next flight plan segment.

In one embodiment, specific and predefined attributes are associated with the independent systems, or at least with part of them, introducing in fact an asymmetry into the prerogatives allocated to the various peers making up the overall system and/or the demands that these peers must satisfy.

Within the common meaning of the master/slave pair, a master system does not require to receive a sequencing interval from a slave system in order to determine its next flight plan segment. On account of its capacity as master system, remaining independent, it can communicate (with authority) to the flight management system the flight plan segment(s) that it determines. A master system may or may not listen to the communications emanating from a slave system.

On the contrary, a slave system becomes dependent on a master system so it requires the receipt of a sequencing interval from the master system in order to be able to determine a next flight plan segment (this involves listening to the calculations performed by the master system).

In a development, the system comprises a number N of systems, one of the systems being of predefined master type, one of the systems being of predefined slave type and the N−2 remaining systems being of indeterminate type.

The indeterminate systems do not have any predefined role. In one embodiment, these systems may be configured to endorse one or the other of the roles, i.e. they can be on standby awaiting allocation of their type, for example as a function of the needs (for example to take over if the slave system and/or the master system have failed). The independent systems are said to be in reserve ("pool"). In one embodiment, for extreme robustness of the sequencing system, a very large number of independent systems may be placed in competition.

In a development, the number N of systems is equal to two, the flight management system being termed dual.

In a development, one system is of predefined master type and the other system is of predefined slave type.

In a development, the first system that is to be sequenced becomes in fact the master system and the second system becomes in fact a dependent slave system.

In one embodiment, the various systems have predefined roles, which are allocated to them beforehand. In one embodiment, all the systems or at least part of them do not have predefined roles. In one embodiment, the allocation of a role of master is conditioned to the fact of sequencing in a valid manner, the other systems becoming slave systems if appropriate.

By contraposition, if an independent system receives from another system a sequencing interval which is not satisfied by the sequencing determined by the said independent system, then the situation is indeterminate: one or the other or both systems have failed. In one embodiment, one and/or the other of the systems ceases to communicate the sequencing intervals. In fact, in a flight management system comprising a large number of competing systems, the "failed" systems (i.e. which are in a situation of indeterminacy as regards their reliability) may isolate themselves from the remainder of the systems (by negotiation with one another), no longer communicating with these latter.

In a development, the number N of systems is equal to three, the flight management system being termed triplex.

In one embodiment, three independent systems interact ("triplication" or "triplex"). One of the three entities is of master type and at least one of the other two systems is of slave type (the third system may be of master type or else of slave type or else be on standby waiting to endorse one or the other role).

The invention claimed is:

1. A method for manipulating aircraft flight plan segments implemented in one or more systems from among a plurality of systems executed in parallel and placed in competition, comprising the steps of:
  determining a next flight plan segment to be performed knowing the active flight segment of the aircraft, the next flight plan segment determining a junction point corresponding to the end of the active flight plan segment and corresponding to the start of the next flight plan segment to be flown;
  determining an interval of change of flight plan segment, the interval being defined in time and/or in space and comprising a start and an end, the start of the interval being situated before the junction point;
  communicating, to at least one other system, the interval of change of flight plan segment determined;
  in at least one system, receiving the interval of change of flight plan segment from at least one other system;
  in at least one system, determining a next candidate flight plan segment if the junction point of the candidate flight plan segment is situated in an interval communicated by at least one other system;
  in at least one system, communicating the next candidate flight plan segment, the segment becoming a selected flight plan segment;
  in at least one system, receiving an interval of change of flight plan segment from another system as long as the at least one system has not determined any interval of change of flight plan segment; and
  deactivating at least one of the systems.

2. The method according to claim 1, further comprising, for an independent system, not or no longer communicating the candidate flight plan segment obtained.

3. The method according to claim 1, further comprising the step of displaying to the pilot of the aircraft the flight plan segment selected from among the flight plan segments determined.

4. The method according to claim 1, the interval of change of flight plan segment termed the sequencing interval being configurable or dependent on the RNP value.

5. The method according to claim 1, each system being associated with a predefined parameter, the method further comprising the step of weighting the determinations of intervals of change of flight plan segment of the systems by the predefined parameters.

6. The method according to claim 5, the weighting comprising mechanisms for voting according to predefined thresholds or predefined spans of thresholds.

7. A computer program product, the computer program comprising code instructions making it possible to perform the steps of the method according to claim 1, when the program is executed on a computer.

8. A system comprising means for implementing the steps of the method according to claim 1.

9. The system for the implementation of the steps of the method according to claim 1, the system comprising a flight management system or FMS.

10. The system comprising a number N of systems according to claim 8, one of the systems being of master type and the N−1 remaining systems being of slave type, a system of master type not requiring to receive a sequencing interval from a system of slave type in order to determine its next flight plan segment and a system of slave type requiring the receipt of a sequencing interval from a system of master type in order to be able to determine a next flight plan segment.

11. The system comprising a number N of systems according to claim 8, one of the systems being of predefined master type, one of the systems being of predefined slave type and the N−2 remaining systems being of indeterminate type.

12. The system according to claim 10, the number N of systems being equal to two, the flight management system being termed dual.

13. The system according to claim 12, one system being of predefined master type and the other system being of predefined slave type.

14. The system according to claim 13, the first system that is to be sequenced becoming in fact the master system and the second system becoming in fact a dependent slave system.

15. The system according to claim 10, the number N of systems being equal to three, the flight management system being termed triplex.

\* \* \* \* \*